(12) United States Patent
Shen et al.

(10) Patent No.: US 9,823,115 B2
(45) Date of Patent: Nov. 21, 2017

(54) PACKAGED OPTICAL DEVICE HAVING A SPECULAR REFLECTION CONFIGURATION

(71) Applicant: PIXART IMAGING INC., Hsin-Chu (TW)

(72) Inventors: Chi-chih Shen, Hsin-Chu (TW);
Hui-Hsuan Chen, Hsin-Chu (TW);
Yen-Min Chang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 15/047,104

(22) Filed: Feb. 18, 2016

(65) Prior Publication Data
US 2016/0161328 A1 Jun. 9, 2016

Related U.S. Application Data

(63) Continuation-in-part of application No. 13/939,484, filed on Jul. 11, 2013, now abandoned.

(30) Foreign Application Priority Data

Jul. 12, 2012 (TW) .............................. 101125172 A

(51) Int. Cl.
*G02B 27/00* (2006.01)
*G01J 1/02* (2006.01)
*G01J 1/04* (2006.01)
*G01V 8/10* (2006.01)
*G01S 7/491* (2006.01)
(Continued)

(52) U.S. Cl.
CPC ........... *G01J 1/0204* (2013.01); *G01J 1/0271* (2013.01); *G01J 1/0407* (2013.01); *G01J 1/0418* (2013.01);
(Continued)

(58) Field of Classification Search
CPC .... G01J 1/0271; G01J 1/22; G01J 1/30; G01J 1/0204; G01J 1/0418; G01J 1/0448;
(Continued)

(56) References Cited

U.S. PATENT DOCUMENTS 4,412,129 A * 10/1983 Duncan .................... G01C 3/10
250/221
5,661,540 A * 8/1997 Kaihotsu ................ G02B 3/005
355/1
(Continued)

FOREIGN PATENT DOCUMENTS

JP 10-267647 A 10/1998
JP 2000-322989 A 11/2000
JP 2007201360 A * 8/2007

*Primary Examiner* — Thanh Luu
*Assistant Examiner* — Kevin Wyatt
(74) *Attorney, Agent, or Firm* — Winston Hsu

(57) ABSTRACT

A packaged optical device includes a light source device emitting light to an object surface, a sensor chip receiving reflective light reflected from the object surface, and a non-lens transparency layer located in front of the sensor chip. The light and the reflective light have a first main optic axis and a second main optic axis, respectively, and the first main optic axis and the second main optic axis are configured to form the specular reflection configuration, thereby enhancing images received by the sensor chip. The non-lens transparency layer has a zone passed through by the second main optic axis, and transmittance of the zone is lower than that of other zones of the non-lens transparency layer, thereby preventing the sensor chip from being saturated.

7 Claims, 7 Drawing Sheets

(51) Int. Cl.
*G01S 17/02* (2006.01)
*G01S 7/481* (2006.01)

(52) U.S. Cl.
CPC .......... *G01J 1/0448* (2013.01); *G01S 7/4813* (2013.01); *G01S 7/4816* (2013.01); *G01S 7/4918* (2013.01); *G01S 17/026* (2013.01); *G01V 8/10* (2013.01)

(58) Field of Classification Search
CPC ...... G01J 1/0407; H01L 31/12; H01L 31/125; H01L 31/16; H01L 23/04; G01V 8/10; G01S 7/4918; G01S 7/4816; G01S 7/4813; G01S 17/026; G01S 250/551
USPC ................................. 250/551, 559.27, 559.4
See application file for complete search history.

(56) References Cited

U.S. PATENT DOCUMENTS

| | | |
|---|---|---|
| 6,740,862 B2 | 5/2004 | Paritsky et al. |
| 6,967,321 B2 | 11/2005 | Leong et al. |
| 7,050,043 B2 | 5/2006 | Huang et al. |
| 7,326,932 B2 | 2/2008 | Hynes et al. |
| 7,365,364 B2 | 4/2008 | Huang et al. |
| 7,858,919 B2 | 12/2010 | Funakubo et al. |
| 2004/0047050 A1 | 3/2004 | Bauer et al. |
| 2005/0093825 A1 | 5/2005 | Chang et al. |
| 2006/0256086 A1 | 11/2006 | Xie et al. |
| 2011/0133941 A1 | 6/2011 | Yao et al. |
| 2014/0313708 A1* | 10/2014 | Cheng .................. F21V 21/096 362/191 |
| 2015/0241270 A1 | 8/2015 | Matsuno |

\* cited by examiner

US 9,823,115 B2

1

PACKAGED OPTICAL DEVICE HAVING A SPECULAR REFLECTION CONFIGURATION

REFERENCE TO RELATED APPLICATION

This application is a Continuation-in-Part of U.S. patent application Ser. No. 13/939,484, filed on Jul. 11, 2013, which claims the priority benefit of Taiwan Patent Application No. 101125172, filed on Jul. 12, 2012, all of which are incorporated herein by reference in their entireties.

FIELD OF THE INVENTION

The present invention is related generally to an optical device and, more particularly, to a packaged optical device having a specular reflection configuration.

BACKGROUND OF THE INVENTION

In applications of optical sensors, usually a lens is installed on the optical path to focus light onto a sensor chip. For example, U.S. Patent Application Publication No. 2005/0093825 forms a lens structure on a carrier of an optical sensor. However, this art does not seal up the sensor chip and thus, suspended particles and other contaminations would easily attach on the sensitive surface of the sensor chip and thereby degrade the sensitivity of the sensor chip. Moreover, the sensor chip is too fragile to be polished, that makes the troubleshooting more difficult. To protect a sensor chip, various package structures have been proposed for enclosing the sensor chip, with only a light transmission hole on the package structure called an opening. For example, U.S. Patent Application Publication No. 2006/0256086 and Japan Patent Application Publication Nos. JP 10-267647 and 2000-322989 employ a cover having a lens structure to cover a sensor chip, and U.S. Pat. No. 6,967,321 employs a cover having a lens structure to block the opening of a package. However, these arts require extremely high precision package components to allow the lens structure to produce required focus effect. U.S. Pat. No. 7,326,932 directly attach a cap having an optical refractive surface onto a wafer, and U.S. Pat. No. 7,365,364 employs a semiconductor process to form dielectric and conductor layers on a sensor chip and then attaches a glass plate thereon. These two arts require even higher precision processes, the structure of the products are more fragile, and the process has to be carried out during the manufacturing process of the sensor chip. Alternatively, U.S. Pat. No. 7,050,043 attaches a lens on the opening of the package frame of a sensor chip. Although this art needs less precision on the assembly components and less costs, it still requires extra optical alignment process, and the lens would fall off easily. Besides, when combining the lens and the package frame, suspended particles and other contaminations might attach onto the sensitive surface of the sensor chip. Actually, in some applications, such as proximity sensing of human body, no lens is required. For example, when an optical sensor in a mobile phone detects that a user picks up a phone call and lifts the receiver to his ear, the display would be temporarily shut down. Such applications do not need a lens to focus light onto the optical sensor. However, if the optical sensor is not sealed up because it does not need a lens, it would have a higher risk of sensor break down.

On the other hand, due to the hardware limitation or the application requirement of an optical sensor, reducing light intensity to impart on the optical sensor or filtering out certain wavelength of light to the optical sensor might be required under some conditions. Conventionally, an additional filter is required for this purpose, while it increases the cost of the hardware and assembly process and the risk of inaccurate in the optical path.

SUMMARY OF THE INVENTION

An objective of the present invention is to provide a packaged optical device having a specular reflection configuration.

Another objective of the present invention is to provide a package structure for enhancing image received by a sensor chip.

Yet another objective of the present invention is to provide a package structure for preventing a sensor chip from being saturated.

According to the present invention, a packaged optical device includes a light source device emitting light to an object surface, a sensor chip receiving reflective light reflected from the object surface, and a non-lens transparency layer located in front of the sensor chip. The light and the reflective light have a first main optic axis and the has a second main optic axis, respectively, and the first main optic axis and the second main optic axis are configured to form the specular reflection configuration. The non-lens transparency layer has a zone passed through by the second main optic axis, and transmittance of the zone is lower than that of other zones of the non-lens transparency layer.

Since the first main optic axis and the second main optic axis are configured to form the specular reflection configuration, the package structure could enhance images received by the sensor chip.

The non-lens transparency layer could prevent the sensor chip from being saturated since it has lower transmittance for the zone passed through by the second main optic axis.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
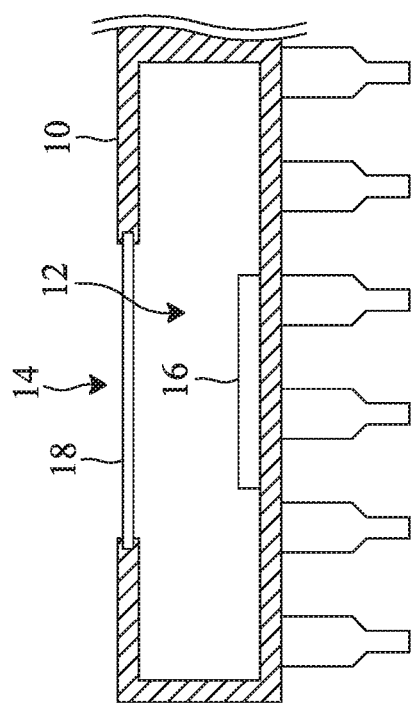
FIG. 1 is a schematic view of a first embodiment according to the present invention.

FIG. 1 is a schematic view of a first embodiment according to the present invention, in which a packaged optical device includes a package frame 10, for example a lead-frame, which has a compartment 12 and an opening 14 at the roof of the compartment 12, a sensor chip 16 bonded in the compartment 12 and facing the opening 14, and a non-lens transparency layer 18 embedded in the package frame 10 at the opening 14, and having at least a portion sealing up the opening 14. Since the sensor chip 16 is sealed up inside the compartment 12, this package structure could avoid adhesion of suspended particles or other contaminations onto the sensitive surface of the sensor chip 16. Preferably, the diameter of the opening 14 is slightly larger than the width of the sensor chip 16, so that disturbance of undesirable light to the sensor chip 16 could be reduced. Since the non-lens transparency layer 18 is embedded in the package frame 10, the packaged optical device could endure greater external impact and vibration, and the non-lens transparency layer 18 would not fall off easily. Preferably, the non-lens transparency layer 18 is made of material with higher hardness, so that the non-lens transparency layer 18 could sustain the force of rubbing away the adhered particles and contaminations thereon, and cleaner could be applied on the non-lens transparency layer 18 to remove blotch. Preferably, the non-lens transparency layer 18 includes glass or plastic. Preferably, the non-lens transparency layer 18 is embedded in the package frame 10 before packaging the sensor chip 16, so the process of sealing up the opening 14 would not cause adhesion of suspended particles or other contaminations onto the sensitive surface of the sensor chip 16. It is noted that depending on different designs, the opening may have different structures, for example, the compartment around the opening bumps up, etc.

The sensor chip 16 could be installed onto the package frame 10 by wire bonding or bumping connection, which are well known and thus the wiring details is not shown in FIG. 1, and not in the following drawings also.

In an embodiment, the non-lens transparency layer 18 has at least a portion doped with photochromic material whose transmittance changes under different light intensity of certain wavelength. For example, under an environment of ultraviolet (UV) light, silver chloride (AgCl) and silver bromide (AgBr) would become darker as light intensity increasing and thus decrease the transmittance. Therefore, when higher intensity light passes through the non-lens transparency layer 18, the non-lens transparency layer 18 would lower down the transmittance to maintain the sensor chip 16 receiving clear images or avoid the sensor chip 16 becoming saturated.

In an embodiment, the non-lens transparency layer 18 has at least a portion doped with optical filtering material which allows light of certain wavelength to pass through. For this purpose, there're many approaches could be applied, one of them is to dope with dye. For example, if the non-lens transparency layer 18 is doped with blue dye, then when light passes through the doped portion, only blue light is transmitted while other colors are absorbed, so the required light could be selected in this way. When the non-lens transparency layer 18 is doped with black dye, the doped portion allows only infrared ray (IR) and UV light to pass through.

Figure 2:
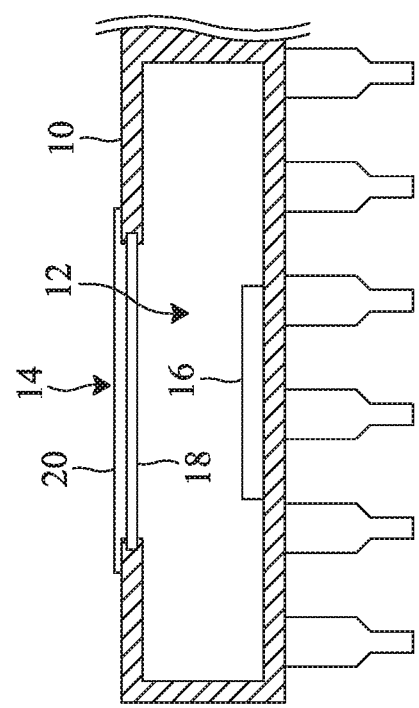
FIG. 2 is a schematic view of a second embodiment according to the present invention.

FIG. 2 is a schematic view of a second embodiment according to the present invention, which is obtained by applying a layer of optical filtering material 20 onto the non-lens transparency layer 18 at the opening 14 of the embodiment shown in FIG. 1, to filter out undesired light and allow only the required light such as IR and UV light to pass through. Preferably, the optical filtering material 20 is pasted or coated on the outside of the compartment 12 as shown in FIG. 2. This introduces an extra advantage that a same set of package assemblies could be applied to different wavelength applications and specific optical filtering material 20 is applied after the assembly process depending on specific wavelength application. In other embodiments, the non-lens transparency layer 18 is pasted or coated with the layer of optical filtering material 20 first, then embedded in the package frame 10 at the opening 14.

Figure 3:
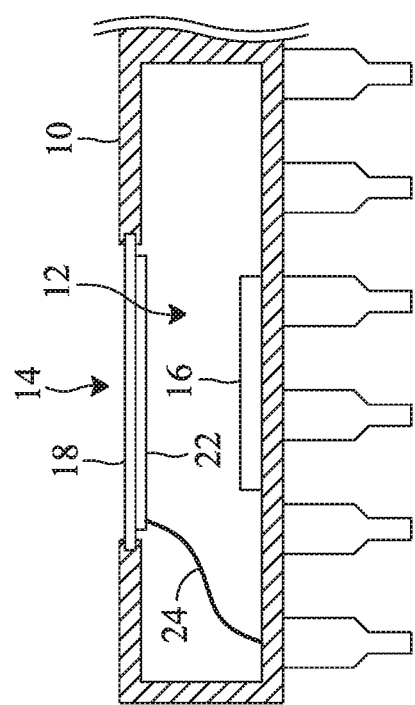
FIG. 3 is a schematic view of a third embodiment according to the present invention.

FIG. 3 is a schematic view of a third embodiment according to the present invention, which is obtained by applying a layer of electrically controlled chromic material 22, such as electrochromic material, liquid crystal material and so on, onto the non-lens transparency layer 18 at the opening 14 of the embodiment shown in FIG. 1, to control the transmittance at the opening 14 by electrical signals. When being applied different voltages, liquid crystal molecules would have different twisted angles, and thus result in different transmittance thereof. On the other hand, there are many choices among electrochromic materials, e.g., for inorganic material, tungsten oxide and nickel oxide, and for organic material, viologens, conducting polymers, metallopolymers, metallophthaloyanines and so on. As shown in FIG. 3, a conductive wire 24 is electrically connected between the layer of electrochromic material 22 and the package frame 10, and the transmittance of the layer of electrochromic material 22 can be controlled by applying an electrical signal (current or voltage) to the layer of electrochromic material 22 through the conductive wire 24. This embodiment could actively control the transmittance of the opening 14, and thus find more broaden and elastic applications, for example, dynamically adjusting the transmittance depending on the sensing requirement, e.g. preventing the sensor chip 16 from being saturated, or selectively adjusting the intensity of received light to different sensing area of the sensor chip 16.

Figure 4:
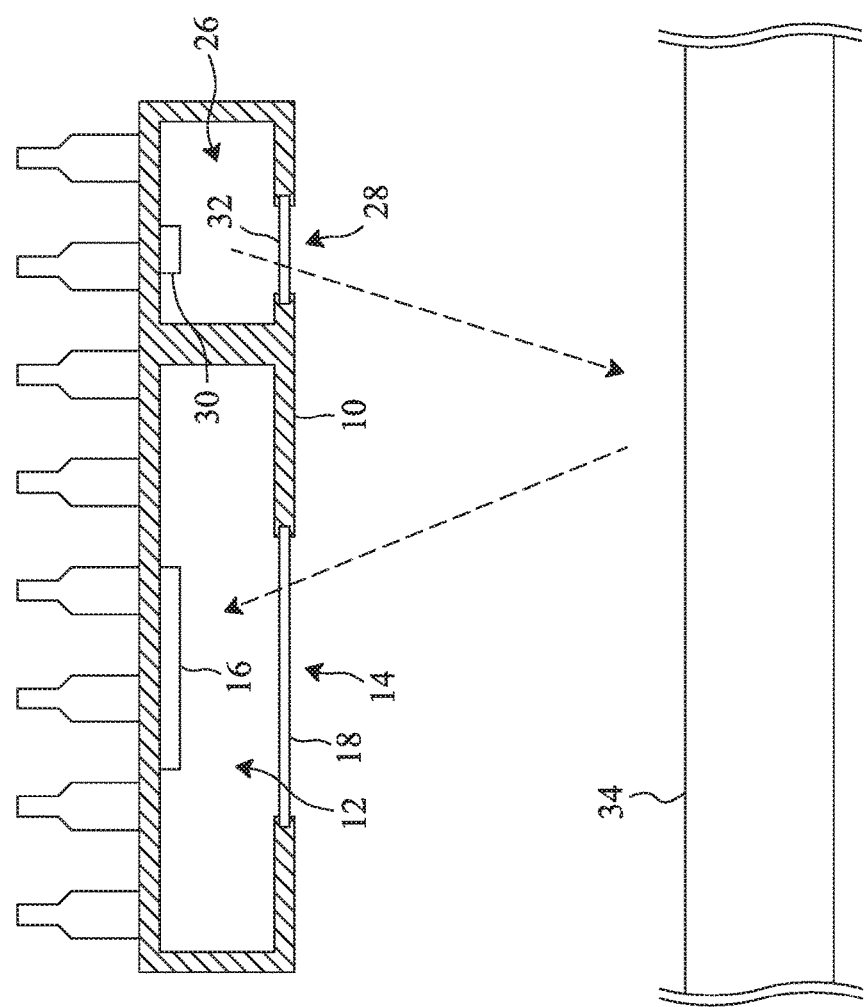
FIG. 4 is a schematic view of a fourth embodiment according to the present invention.

FIG. 4 is a schematic view of a fourth embodiment according to the present invention, in which, besides the aforementioned structure, the package frame 10 further includes another compartment 26 and another opening 28, a light source device 30 such as LED is bonded in the compartment 26, and another non-lens transparency layer 32 is embedded in the package frame 10 at the opening 28, and has at least a portion sealing up the opening 28. This embodiment illustrates a miniaturized optical module, which could be used on optical mice or for proximity sensing of human body. The light emitted from the light source device 30 passes through the non-lens transparency layer 32 to project onto an object surface 34, and is reflected by the object surface 34 to pass through the non-lens transparency layer 18 to project onto the sensor chip 16. From images received by the sensor chip 16, it is able to detect movement of an optical mouse or approach of a human body.

Figure 5:
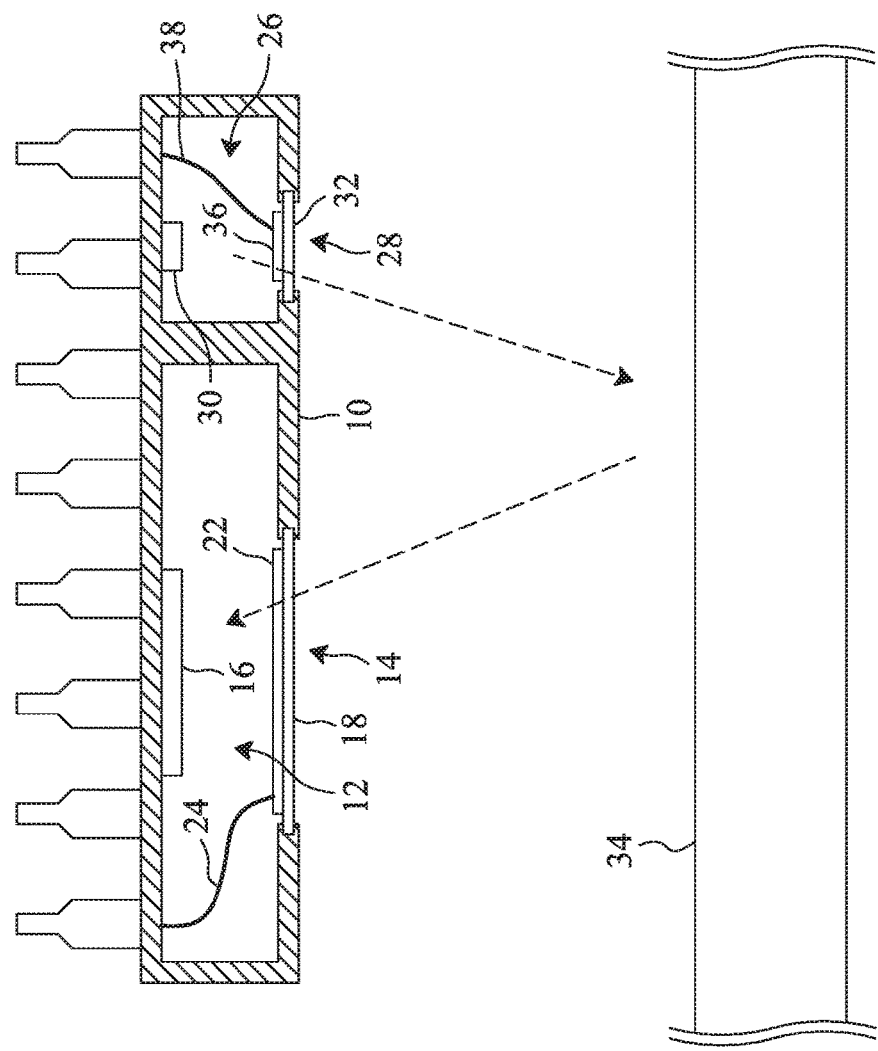
FIG. 5 is a schematic view of a fifth embodiment according to the present invention.

FIG. 5 is a schematic view of a fifth embodiment according to the present invention, which includes, besides the aforementioned structure, another layer of electrically controlled chromic material 36 over the non-lens transparency layer 32, and another conductive wire 38 connected between the layer of electrically controlled chromic material 36 and the package frame 10. By applying an electrical signal (current or voltage) onto the layer of electrically controlled chromic material 36 through the conductive wire 38, the transmittance of the opening 28 could be controlled. In addition to the aforementioned applications, this miniaturized optical module could modulate the light received by the sensor chip 16 by modulating the transmittance of the layers of electrically controlled chromic material 36 and 22, to enhance optical sensing of the sensor chip 16.

Figure 6:
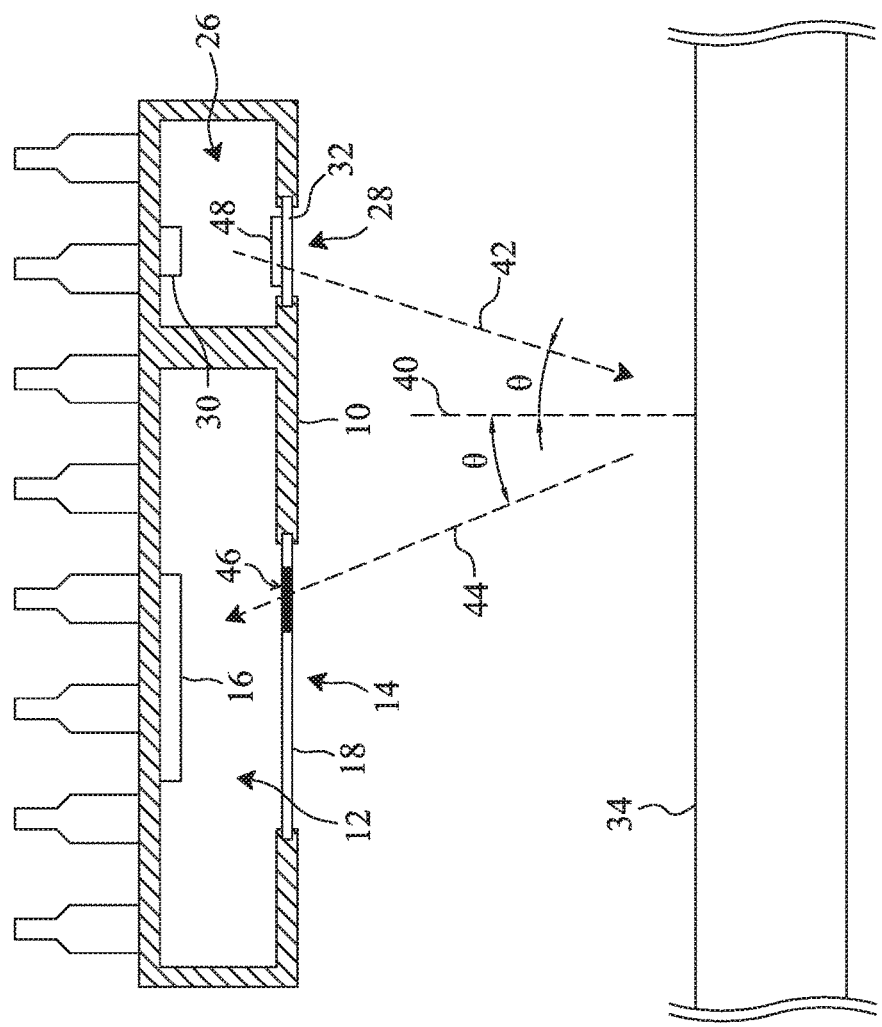
FIG. 6 is a schematic view of a sixth embodiment according to the present invention.

FIG. 6 is a schematic view of a sixth embodiment according to the present invention, which includes, besides the structure shown in FIG. 4, another lens 48 located in front of the light source device 30, for example, over the non-lens transparency layer 32. In FIG. 6, the light source device 30 emits the light having a main optic axis 42 which indicates the main transmission direction of the light, and the light emitted by the light source device 30 passes through the opening 28 to project onto the object surface 34. The object surface 34 reflects the light to generate reflective light having a main optic axis 44 which indicates the main transmission direction of the reflective light, the reflective light reflected by the object surface 34 passes through the opening 14 to project onto the sensor chip 16, and the sensor chip 16 receives the reflective light passing through the opening 14. The lens 48 is configured to adjust the direction of the main optic axis 42, such that the main optic axis 42 and the main optic axis 44 are configured to form a specular reflection configuration, for example, the main optic axis 42 and the main optic axis 44 are symmetrical in a line 40 perpendicular to the object surface 34, namely the angle between the main optic axis 42 and the line 40 and the angle between the main optic axis 44 and the line 40 are the same (e.g. equal to θ). Thus, this embodiment could enhance images received by the sensor chip 16 since the reflective light reflected from the object surface 34 will form clearer images when the main optic axes 42 and 44 form the specular reflection configuration. Preferably, the non-lens transparency layer 18 has a zone 46 which is passed through by the main optic axis 44, and the transmittance of the zone 46 is lower than that of other zones of the non-lens transparency layer 18. Thus, this embodiment could prevent the sensor chip 16 from being saturated.

Figure 7:
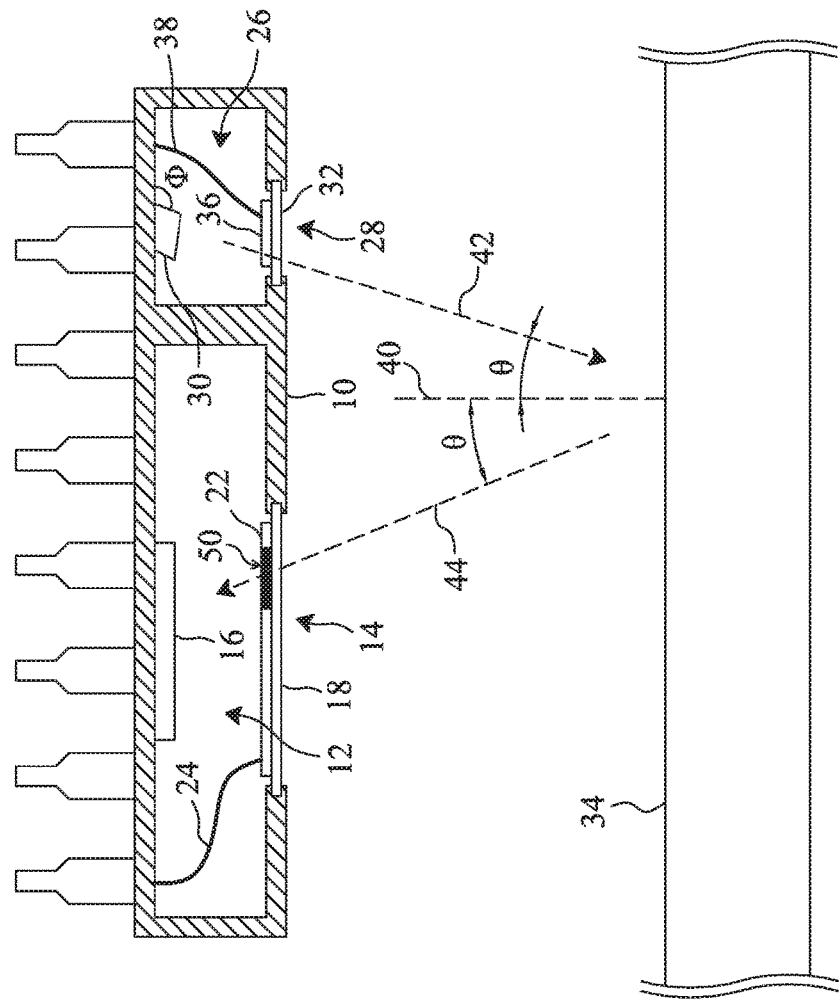
FIG. 7 is a schematic view of a seventh embodiment according to the present invention.

FIG. 7 is a schematic view of a seventh embodiment according to the present invention, which is obtained by varying a bonding angle Φ between the light source device 30 and the package frame 10 in the embodiment shown in FIG. 5. In FIG. 7, the light source device 30 is bonded to the package frame 10 with the bonding angle Φ and emits the light having the main optic axis 42 which indicates the main transmission direction of the light, and the light passes through the opening 28 to project onto the object surface 34. The light emitted by the light source device 30 is reflected by the object surface 34 to pass through the opening 14 to project onto the sensor chip 16, and the reflective light reflected from the object surface 34 has the main optic axis 44 which indicates the main transmission direction of the reflective light. The bonding angle Φ is controlled to adjust the direction of the main optic axis 42, such that the main optic axis 42 and the main optic axis 44 are configured to form the specular reflection configuration. Thus, this embodiment could enhance images received by the sensor chip 16, and the lens 48 shown in FIG. 6 can be removed. Preferably, the layer of electrochromic material 22 has a zone 50 which is passed through by the main optic axis 44, and the transmittance of the zone 50 is lower than that of other zones of the layer of electrochromic material 22 by applying an electrical signal (current or voltage) to the layer of electrochromic material 22 through the conductive wire 24. Thus, this embodiment not only enhances images received by the sensor chip 16 but also prevents the sensor chip 16 from being saturated.

While the present invention has been described in conjunction with preferred embodiments thereof, it is evident that many alternatives, modifications and variations will be apparent to those skilled in the art. Accordingly, it is intended to embrace all such alternatives, modifications and variations that decrease within the spirit and scope thereof as set forth in the appended claims.

What is claimed is:

1. A packaged optical device having a specular reflection configuration, the package optical device comprising:
   a package frame having a first compartment, a second compartment, a first opening and a second opening;
   a light source device bonded in the first compartment such that the light source device may emit light to pass through the first opening to project onto an object surface, wherein the light has a first main optic axis;
   a sensor chip bonded in the second compartment such that the sensor chip may receive reflective light passing through the second opening, wherein the reflective light is reflected from the object surface and has a second main optic axis;
   a first non-lens transparency layer embedded in the package frame at the first opening, and having at least a portion sealing up the first opening and
   a second non-lens transparency layer embedded in the package frame at the second opening, and having at least a portion sealing up the second opening and a zone passed through by the second main optic axis;
   wherein the first main optic axis and the second main optic axis are configured to form the specular reflection configuration, and transmittance of the zone is lower than that of other zones of the second non-lens transparency layer;
   wherein the light source device is bonded to the package frame with a bonding angle;
   wherein the bonding angle is controlled to adjust direction of the first main optic axis.

2. The packaged optical device of claim 1, further comprises a lens located in front of the light source device to adjust direction of the first main optic axis.

3. The packaged optical device of claim 1, wherein the at least a portion of the second non-lens transparency layer is doped with photochromic material and is configured to change transmittance under different light intensity of certain wavelength.

4. The packaged optical device of claim 1, wherein the at least a portion of the second non-lens transparency layer is doped with optical filtering material.

5. The packaged optical device of claim 1, wherein the at least a portion of the second non-lens transparency layer is coated or pasted with a layer of optical filtering material.

6. The packaged optical device of claim 1, wherein the at least a portion of the second non-lens transparency layer is coated or pasted with a layer of electrochromic material.

7. The packaged optical device of claim 1, wherein the second non-lens transparency layer comprises glass or plastic.

* * * * *